United States Patent [19]

Doctor

[11] 4,437,003
[45] Mar. 13, 1984

[54] DIFFERENTIAL PYROELECTRIC SENSOR WITH STATIC DISCHARGE

[75] Inventor: Alan P. Doctor, Ormond Beach, Fla.

[73] Assignee: Eltec Instruments, Inc., Orlando, Fla.

[21] Appl. No.: 287,883

[22] Filed: Jul. 29, 1981

[51] Int. Cl.³ .............................................. G01J 5/10
[52] U.S. Cl. .................................... 250/338; 250/342
[58] Field of Search ...................... 250/338, 342, 349; 374/177; 307/400

[56] References Cited

U.S. PATENT DOCUMENTS

| | | | |
|---|---|---|---|
| 4,336,452 | 6/1982 | Baker | 250/338 |
| 4,367,408 | 1/1983 | Imai et al. | 250/336 |

Primary Examiner—Alfred E. Smith
Assistant Examiner—Carolyn E. Fields
Attorney, Agent, or Firm—Duckworth, Allen, Dyer & Pettis

[57] ABSTRACT

A dual pyroelectric crystal sensor, connected electrically in series opposition to provide ambient temperature compensation, drives a single ended amplifier. The load resistor for the sensor is a center tapped high megohm resistor with the center tap connected to the common electrode connections between the dual crystals to bleed off static charges that build up on the sensor due to the very high impedance of the crystal material.

11 Claims, 5 Drawing Figures

DIFFERENTIAL PYROELECTRIC SENSOR WITH STATIC DISCHARGE

BACKGROUND OF THE INVENTION

1. Field of the Invention

The present invention relates to a pyroelectric thermal radiation sensor and more particularly to a single ended pyroelectric thermal radiation sensor having two elements connected in series opposing fashion having means for preventing static charge build up.

2. Description of the Prior Art

The use of pyroelectric sensors using polarized crystals and plastic films for detection of thermal radiation is well known. There have been many uses developed for such pyroelectric sensors. One important application is in the field of intruder alarms in which a pyroelectric sensor is arranged to detect the infrared radiation from a human being as an indication of an intruder. However, some prior art intruder alarms can be falsely triggered by other sources of infrared radiation such as hot air from a heating system, sunlight, or equipment which may give off heat radiation. To discriminate between an actual intruder and such environmental effects, it is known to require movement of the source of heat. For this purpose, it is common to utilize at least two collocated detectors in a differential connection so as to produce zero net signal output when both detectors are irradiated and to produce multiple pulse outputs when a person walks past the device. A typical example is shown in U.S. Pat. No. 3,839,640 to Rossin which teaches the use of two pyroelectric sensors formed from a single piece of polyvinylidene fluoride (PVF$_2$) plastic film. This patent shows two such sensors connected in series opposition. The Rossin detector, which uses a single PVF$_2$ film, has a "floating" rear electrode and two front electrodes such that a series opposition connection is obtained with respect to the two front electrodes. The detector drives a single-ended amplifier. Although there is no external connection to the rear electrode, PVF$_2$ has a finite leakage resistance which serves to bleed off any static charge build up on the "floating" electrode.

Pyroelectric crystals have been found to be much superior to pyroelectric PVF$_2$ films since the plastic film is flimsy and easily damaged. The output for a given area PVF$_2$ sensor is much less than for crystal types. Liu, in U.S. Pat. No. 3,816,750, discloses a dual detector, series opposition connected differential sensor utilizing a polarized crystal which produces a higher output than a similar size PVF$_2$ type. A problem can arise with the Liu type sensor if used to drive a single ended amplifier with the common electrode floating. As is well known, the resistivity of the inorganic pyroelectric crystals is very high compared to PVF$_2$. When the common electrode is left floating, electrostatic charges can build up on one or the other element. Experiments have shown voltages in the 100-300 volt range can occur. The crystal may attract small dust particles or other contaminates which impinge causing momentary changes in dielectric constant. These actions can cause random noise and biasing problems when directly coupled to very high impedance amplifiers such as field effect transistors (FET).

SUMMARY OF THE INVENTION

The present invention is a differential pyroelectric sensor having two pyroelectric crystal detectors connected in a series opposing connection with the output therefrom driving a single ended high impedance amplifier such as a field effect transistor (FET). A load resistor for the series opposed pyroelectric detector is formed from two equal value high megohm resistors in which the center tap between the resistors is connected to the common electrodes between the two detectors. This connection places a resistor in parallel with each of the separate pyroelectric detectors. Due to the extremely high impedance of the detectors, very high static charges can build up on the common plates in the series connection when such connection is left floating. Advantageously, the connection of the present invention permits any such charges to quickly bleed off through the parallel portions of the load resistor. This results in elimination of random noise which may occur due to changes in dielectric constant of the crystal with an accumulated electrostatic voltage and from impingement of particles which may occur due to static charges.

The series opposed pyroelectric detectors, the load resistors and the amplifier may be mounted on the header of a TO-5 can and the cover of the can provided with a window through which radiation may be directed to the detectors. The window is covered by a filter which may be selected to produce sensitivity to a desired portion of the spectrum.

As is well known in the art, the series opposed connection of the two pyroelectric detectors results in a voltage being developed across the resistance load when one of the detectors is receiving higher incident radiation than the other detector. This is due to the reverse polarity connection such that the voltage produced by one detector is always in the opposite polarity and therefore opposing the voltage produced by the other detector. When external heat radiation falls on both detectors equally, the individual voltages produced are equal and of opposite polarity and therefore the net voltage across the load resistor is zero. As a result of this action, a change in the ambient temperature will not produce an output signal from the differential sensor.

It is therefore a principal object of the invention to provide a series opposed differential pyroelectric sensor having a center tapped load resistor across the output terminals thereof with the center tap connected to the common terminal of the two detectors to thereby bleed off any static charges which would otherwise tend to accumulate across one or the other of the detectors.

It is another object of the invention to provide a series opposed differential pyroelectric detector which is free from random noise due to random changes of dielectric constant of the pyroelectric material from build up of static voltages across the detector.

It is still another object of the invention to provide a series opposed differential pyroelectric sensor free from random noise due to the attraction of particles to the dielectric material from build up of static charges.

It is a further object of the invention to provide a sensor as described above which may be mounted in a TO-5 can having a window and filter element to control the sensitivity range of the device.

These and other objects and advantages of the invention may be determined from the following detailed description and the drawings.

DETAILED DESCRIPTION OF THE PREFERRED EMBODIMENT

Figure 1:
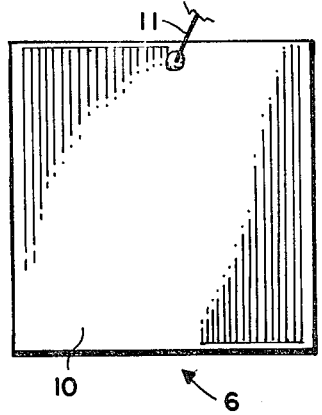
FIG. 1 is a front view of the dual sensor element.
Figure 2:
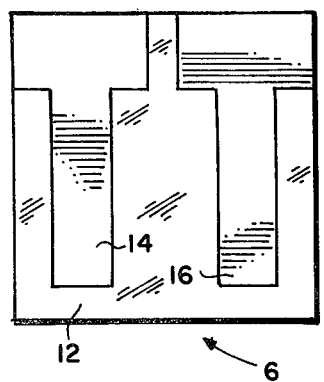
FIG. 2 is a rear view of the dual sensor element.
Figure 3:
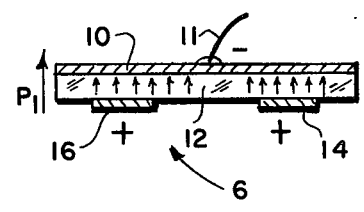
FIG. 3 is an edge view of the dual sensor element.

The present invention utilizes a dual sensor element having a pair of pyroelectric detectors fabricated on a single pyroelectric crystal. FIGS. 1, 2 and 3 show details of the dual sensor element 6. In FIG. 1, the front of the sensor element 6 is shown in which the entire surface of the crystal is covered with a deposited conductive electrode 10. A connecting lead 11 is shown attached to electrode 10. FIG. 2 shows the rear surface of sensor element 6 with crystal 12 having two identical electrodes 14 and 16 deposited thereon. Lead 13 provides a connection to electrode 14 and lead 15 provides a connection to electrode 16. As may be understood, the portions of pyroelectric crystal 12 between electrode 14 on the rear surface and electrode 10 on the front surface form a first pyroelectric detector, and rear electrode 16 with front electrode 10 form a second pyroelectric detector. From the lower edge view of the element 6 in FIG. 3, the active parts of crystal 12 between electrodes 16 and 14 and electrode 10 may be seen. The entire crystal 12 is polarized in the direction as indicated by arrow P1 and the small arrows as shown. Therefore, irradiation of crystal 12 in the region of electrode 16 will cause a negative voltage to appear on electrode 10 and a positive voltage on electrode 16. Similarly, irradiating the crystal in the region of electrode 14 will produce a negative voltage on electrode 10 and a positive voltage on electrode 14. Since the effective pyroelectric material in either case is part of crystal 12 and the electrodes 14 and 16 are identical, equal radiation to both areas will produce exactly the same voltages across each pair of electrodes. Thus, if the entire sensor element 6 is irradiated, it may be seen that the two voltages will be exactly equal and of opposite polarity and therefore there will be zero voltage appearing between lead 13 and lead 15. As is well known, this connection is referred to as being in series opposition. When only one area is energized, for example the area around electrode 16, a voltage will be produced between electrode 10 and electrode 16 but that source of radiation will not cause a voltage to appear between electrode 10 and electrode 14. Therefore the output voltage between leads 13 and 15 will be essentially equal to the voltage between electrode 10 and electrode 16. Thus, sensor 6 is a single ended differential sensor.

Although a number of crystals that exhibit the pyroelectric effect may be used to fabricate crystal 12, a preferred material is lithium tantalate. Lithium tantalate, being a non-organic true crystalline structure, is an excellent insulator to electricity and therefore has an extremely high resistance. Since the pyroelectric phenomena results in movements of charges when the material is subjected to thermal radiation, some charges will tend to collect on the electrodes. Assuming for purposes of explanation that lead 11 is left floating, then it may be understood that charges can collect on electrode 10. Due to the high resistivity of crystal 12, the charges may remain on electrode 10 for a long period of time before eventually being bled off to electrodes 16 and 14. If the element continues to be irradiated with thermal radiation, such charge collection can become cumulative and eventually quite large static voltages can be developed. Although great care may be taken in packaging sensor element 6, small particles of matter may be unavoidable and can be attracted to the highly charged plates. Such particles striking the plates can produce noise voltages between leads 13 and 15. Similarly, the build up of charges produces a static voltage across the electrodes which will cause shifts in charges within the crystalline structure changing the crystal dielectric constant which can also produce noise-like voltage across leads 13 and 15.

As is well known in the art, sensor element 6 may be connected to a differential amplifier having separate amplifier channels to which leads 13 and 15 would be connected with lead 11 being common to the two amplifiers. Where each channel includes a load resistor, such static charges would be quickly equalized. However, it is desirable to utilize sensor element 6 with a single ended amplifier to obviate the need for careful balance and balancing to reject common mode signals. Advantageously, the present invention permits the sensor element 6 to be used with a single ended amplifier without having undesirable static charges build up as described.

Figure 4:
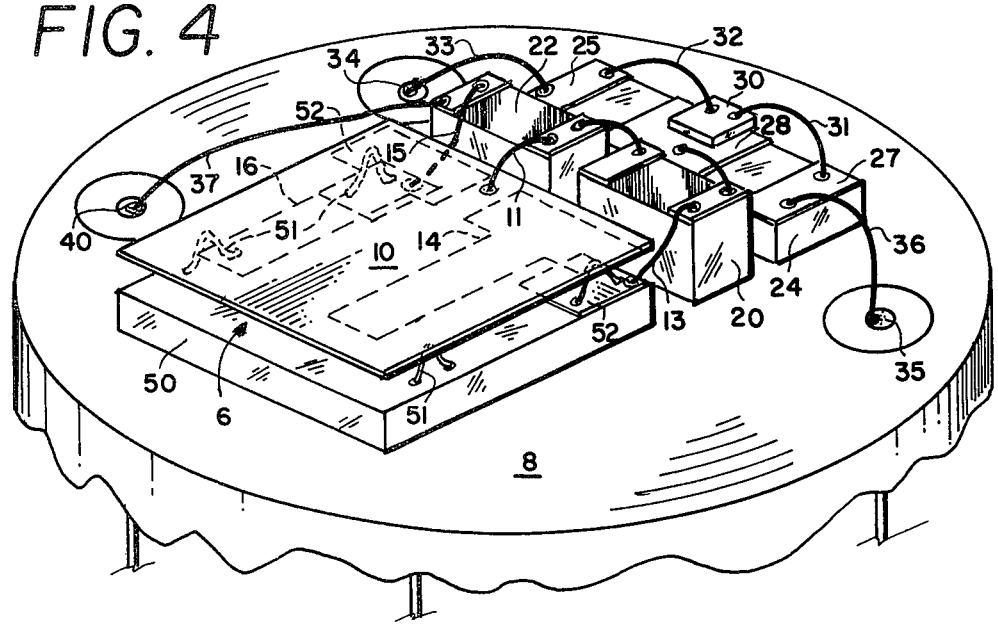
FIG. 4 is a perspective view of the dual sensor element mounted on a header shown in partial view with the load resistors and FET.
Figure 5:
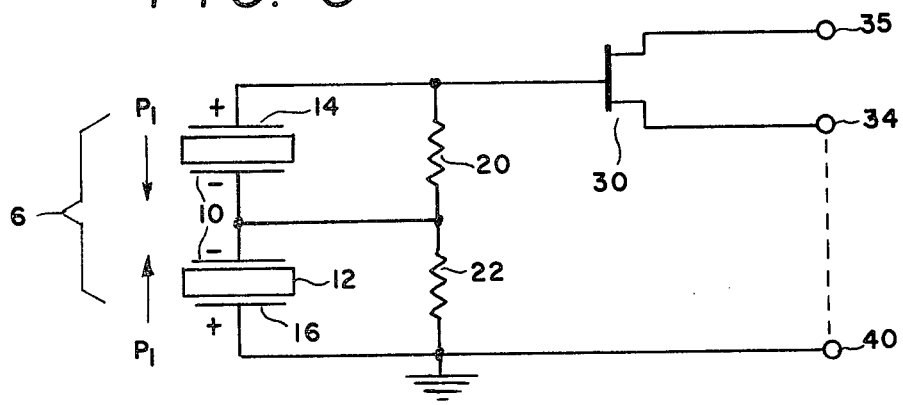
FIG. 5 is a schematic diagram of the sensor shown in FIG. 4.

The present invention utilizes dual sensor element 6 in a package with an amplifier. Turning to FIGS. 4 and 5, the physical structure and the schematic diagram of the invention is shown. As seen best from the diagram of FIG. 5, sensor element 10 has electrode 14 connected to the gate input of FET 30 while electrode 16 connects to ground. The load resistor for sensor element 6, which serves as a bias resistor for FET 30, is formed from two equal valued high megohm resistors 20 and 22. The center tap between resistors 20 and 22 is connected to electrode 10 of sensor 6. Therefore, resistor 20 is effectively in parallel with the first detector and resistor 22 is effectively in parallel with the second detector. Thus, resistors 20 and 22 operate in normal fashion as a load resistor and also serve individually to bleed off static charges between electrode 10 and electrodes 14 and 16. Terminal 35 represents an output connection from FET amplifier 30 with respect to terminal 34. As will be recognized, the load for FET 30 and the power and bias sources are external to the unit. As shown by the dashed line from terminal 34 to ground, terminal 34 would be externally grounded to output signals.

In FIG. 4, a preferred construction for the sensor is shown. Sensor element 6 may have dimensions of 2 mm square and, advantageously, may be mounted within a TO-5 can. Thus, FIG. 4 illustrates the sensor assembly mounted on a TO-5 can header 8. A base 50, which may be ceramic, has a pair of deposited electrodes 52 on its top surface and is cemented to header 8. Sensor element 6 is supported on base 50 by a plurality of conductive spring-like mounts 51 which effectively isolate element 6 from shock and vibration. Mounts 51 also form an electrical connection from electrodes 14 and 16 via electrodes 52 to leads 13 and 15. Thus, only lead 11 from electrode 10 is necessary for sensor element 6 permitting excellent mechanical isolation. The mounting structure is described in detail in U.S. Pat. No. 4,218,620 assigned to the present assignee. High megohm resistors 20 and 22 are cemented to header 8 and connect to sensor element 6 by leads 13, 11 and 15. Electrode 15 is grounded by lead 37 to header output lead 40. A ceramic substrate 24 is cemented to header 8 to provide a mounting for FET 30 and for lead connections. A centrally located electrode 28 is deposited on substrate 24 with the gate electrode of FET 30 attached thereto with conductive cement, such as conductive epoxy. The high end of resistor 20 representing the output from electrode 14 of sensor element 6, connects to the substrate electrode 28. The sink and drain connections of FET 30 connect to electrodes 23 and 25 on substrate 24 by leads 32 and 31, respectively. Leads 33 and 36 connect electrodes 25 and 23 to header output leads 34 and 35, respectively.

As may now be understood, a dual differential series opposed pyroelectric crystal sensor has been disclosed which utilizes a crystal material having an extremely high resistivity such as lithium tantalate and which can be subjected to frequent radiation from thermal sources without building up large static charges on the detector elements. Thus, random noise which may give erroneous thermal detection information when the device is utilized in an intruder alarm is eliminated. Although a preferred embodiment has been disclosed and a specific implementation described in detail, it will be obvious to those of skill in the art to make various changes without departing from the spirit or scope of the invention.

I claim:

1. A two terminal differential thermal sensor comprising:
    a pair of pyroelectric detectors connected in a series opposed connection, said detectors having two output electrodes and a common electrode; and
    first resistor means connected between one of said output electrodes and said common electrode and second resistor means connected between the other of said output electrodes and said common electrode for bleeding static charges from said pair of detectors.

2. A two terminal differential infrared intruder sensor comprising:
    a polarized pyroelectric crystal;
    first and second electrodes disposed on a first surface of said crystal;
    a common electrode disposed on a second surface of said crystal opposite said first surface, said first electrode overlapping said common electrode to form a first pyroelectric detector, and said second electrode overlapping said common electrode to form a second pyroelectric detector, said first and second detectors connected electrically in series opposition; and
    resistor means connected to said first and second electrodes and to said common electrodes for bleeding static charges from said detectors.

3. The sensor as defined in claim 2 which further comprises single ended amplifier means having input terminals connected to said first and second electrodes.

4. The sensor as defined in claim 3 in which said amplifier means is a field effect transistor.

5. The sensor as defined in claim 4 in which said crystal is made of lithium tantalate.

6. A differential thermal radiation sensor comprising: a dual element pyroelectric detector having
    a. a single polarized pyroelectric crystal having a front surface and a rear surface;
    b. a conductive electrode disposed on said front surface; and
    c. a pair of essentially identical conductive electrodes disposed on said rear surface;
    means for preventing build up of static charges on said front and rear electrodes, said means comprising two equal-value load resistors connected in series, said series resistors connected in parallel with said pair of rear electrodes, and the common connection of said two resistors connected to said front electrode; and
    leads connected to said pair of rear electrodes to define two series opposed connected pyroelectric detectors.

7. The sensor as defined in claim 6 which further comprises single ended amplifier means having input terminals connected by said leads to said pair of rear electrodes.

8. The sensor as defined in claim 7 in which said amplifier means is a field effect transistor.

9. The sensor as defined in claim 8 in which said crystal is made of lithium tantalate.

10. The sensor as defined in claim 9 which further comprises a header having output leads, said pyroelectric detector, said two load resistors, and said field effect transistor mounted on said header, said output leads connected to the output of said field effect transistor.

11. The sensor as defined in claim 10 which further comprises mounting means for said pyroelectric detector for isolating said detector from shock and vibration.

* * * * *